United States Patent Office 2,906,718
Patented Sept. 29, 1959

2,906,718

COMPOSITION COMPRISING A RUBBER, LIGNIN AND POLYISOCYANATE AND METHOD OF PREPARING SAME

George S. Mills, Pompton Plains, and Henry E. Haxo, Jr., Bloomfield, N.J., assignors to United States Rubber Company, New York, N.Y., a corporation of New Jersey No Drawing. Application April 17, 1956
Serial No. 578,568

18 Claims. (Cl. 260—17.5)

This invention relates to lignin-reinforced vulcanizable rubber stocks, as well as to a method of making such stocks and to improved vulcanizates obtained from such stocks.

Formerly, tire treads and similar mechanical rubber products intended for severe abrasive usage were almost invariably compounded with carbon black as a reinforcing agent. The desire for a cheaper reinforcing material than carbon black has more recently led to the proposal that rubber be reinforced with lignin, typically by mixing a solution of the lignin with rubber latex and coprecipitating or otherwise recovering the mixed rubber and lignin solids, which could thereafter be processed much like ordinary rubber stocks. Such methods are disclosed in U.S. Patent 2,608,537 issued to Pollak on August 26, 1952, and in an article by Keilen and Pollak entitled "Lignin for Reinforcing Rubber," Ind. Eng. Chem., 39, 480–483 (April 1947). However, as conventionally prepared the lignin-reinforced rubber products are frequently boardy and poor in abrasion resistance.

We have now discovered that if the lignin-containing rubber stock is treated with an organic polyisocyanate prior to vulcanization, there is obtained after cure a product having markedly improved physical properties, especially higher abrasion resistance and reduced torsional hysteresis.

According to the invention the lignin-containing rubber stock or masterbatch, in the uncured state, is mixed intimately with an organic polyisocyanate. The stock so prepared may contain previously added additional compounding ingredients; or such compounding ingredients, including suitable conventional curatives and the like, may be added subsequent to the treatment with the polyisocyanate. The thus-treated, lignin-containing, compounded rubber stock is thereafter shaped and cured by heat in any desired form in accordance with the usual practices in molding or otherwise fabricating rubber articles.

The rubber latex used in the present invention may be natural rubber latex, or a conjugated diene polymer synthetic rubber latex, or mixtures of any of the same. Such conjugated diene polymer synthetic rubber latex may be an aqueous emulsion polymerizate of a 1,3-butadiene, such as 1,3-butadiene, 2-methyl-butadiene (isoprene), piperylene, 2,3-dimethyl butadiene, or a mixture of such 1,3-butadienes. The conjugated diene polymer synthetic rubber latex may also be an aqueous emulsion polymerizate of a mixture of one or more of such 1,3-butadienes with one or more other polymerizable compounds which are capable of forming rubbery copolymers with 1,3-butadiene, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene $$(CH_2=C<)$$

group which are copolymerizable with 1,3-butadienes are styrene, vinyl toluene, vinyl naphthalene, alpha methyl styrene, parachloro styrene, dichlorostyrene, alpha methyl dichloro styrene, methyl acrylate, ethyl acrylate, methyl methacrylate, acrylonitrile, methacrylonitrile, vinyl pyridines such as 2-vinyl pyridine, and alkyl vinyl pyridines such as 2-methyl-5-vinyl pyridine.

The lignin used in the present invention is preferably the lignin commonly recovered by precipitation from its soluble sodium salt in the black liquor in the kraft sulfate process of wood pulping by acidification of the waste liquor. Lignin is readily soluble in aqueous alkali (e.g. alkali-metal hydroxide or ammonium hydroxide solution) to form alkaline lignate solution in which form it is mixed with the rubber latex. Modified lignins that are soluble in alkalies and insoluble in acids may also be used in the present invention. Examples of such modified lignins are oxidized lignin, slightly chlorinated lignin, slightly nitrated lignin, slightly sulfonated lignin (made either by partially desulfonating the sulfonated lignin made by the sulfite pulp process or by partially sulfonating alkali lignin made by the sulfate pulp process); such modified lignins are equivalent to the lignin made by acidification of waste liquor in the sulfate pulp process in the present invention.

In preparing the lignin-rubber masterbatch according to the present invention, the lignin in the form of an alkaline aqueous solution is admixed with the latex, as shown for example in the Pollak patent and the Keilen et al. article previously referred to. The rubber and lignin thus become intimately mixed in the aqueous medium from which the solids may be recovered by co-coagulation in any suitable manner, such as by spray drying or by coprecipitating, e.g. by means of a dilute acid such as formic or sulfuric acid. The resulting co-coagulated lignin and rubber masterbatch is then washed and dried, and used directly in the practice of the present invention. The ratio of lignin to rubber in the lignin-rubber masterbatch usually ranges from 25 to 100 parts per 100 parts of rubber. If desired, any suitable additional compounding ingredient may be milled into or otherwise incorporated in the mixture at any appropriate stage, including carbon black or other fillers, the usual vulcanizing agents, accelerators, antioxidants, etc. Compounding ingredients added before the polyisocyanate must, of course, be unreactive with the polyisocyanate. If desired, the rubber may be oil-extended at any suitable stage. Mixtures of lignin and rubber made by milling the dry ingredients together do not show reinforcement (see India Rubber World 124, 178–81, 1951). We have found that treatment of such mixtures with polyisocyanates does not result in any significant reinforcement. However, after a part, generally one-half or more, of the total rubber has been co-coagulated with the lignin, additional rubber may be added to the masterbatch on the mill before adding the polyisocyanate and still retain the advantages of our invention.

The organic polyisocyanate used to treat the masterbatch or unvulcanized lignin-rubber stock in accordance with the invention may be any known polyisocyanate, such as a diisocyanate or a triisocyanate. Examples are polymethylene diisocyanates such as ethylene diisocyanate, hexamethylene diisocyanate and tetramethylene diisocyanate; alkylene diisocyanates such as propylene-1,2-diisocyanate, cycloalkylene diisocyanates such as 1,4-diisocyanatocyclohexane, as well as aromatic diisocyanates such as m- and p-phenylene diisocyanate, toluene diisocyanate, p,p'-diphenyl diisocyanate and 1,5-naphthalene diisocyanate, in which category we include aliphatic-aromatic diisocyanates such as p,p'-diphenylmethane diisocyanate and phenylethane diisocyanate

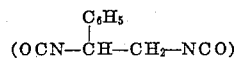

Among the triisocyanates may be mentioned those having isocyanate groups attached to a trivalent hydrocarbon radical, whether an aliphatic, aromatic, or aliphatic-aromatic radical as in butane-1,2,2-triisocyanate, benzene-1,3,5 - triisocyanate, diphenyl - 2,4,4' - triisocyanate, diphenyl-4,6,4'-triisocyanate, toluene - 2,4,6 - triisocyanate, ethyl benzene-2,4,6-triisocyanate, and triphenylmethane 4,4',4''-triisocyanate. Triisocyanates derived from corresponding substituted trivalent hydrocarbon radicals, such as monochlorobenzene-2,4,6-triisocyanate may also be used.

For purposes of the invention, a small amount of the polyisocyanate is simply milled into or otherwise suitably uniformly incorporated in the solid lignin-rubber mixture. This mixing may be carried out either on a cold mill or on a heated mill, and the mixing need not be any more prolonged than is necessary to produce a homogeneous stock. The polyisocyanate is highly effective in producing the desired improvements, and as little as about one-half of one part by weight of polyisocyanate in 100 parts of rubber is sufficient to produce noticeable improvement. We generally prefer to use somewhat more polyisocyanate than this, say 1 or 2 parts, and increasing benefits may be noted with increasing quantities of polyisocyanate, up to about 8 or 10 parts, or even more.

It is frequently found to be advantageous to heat-treat the lignin-rubber mixture, either before or after adding the polyisocyanate. A heat treatment may be performed both before and after adding the polyisocyanate. The heat treatment is typically accomplished by heating the mixture at an elevated temperature for a suitable period of time, say for a period of from 5 minutes to 1 hour with mastication, or from 2 to 10 hours statically, at a temperature of from 200° F. to 350° F. or even higher, provided care is taken not to heat the mixture so long or at such a high temperature as to cause thermal injury. (The shorter times of treatment are most suitably employed with the higher treating temperatures, and conversely, longer treating times are appropriately employed with the lower temperatures mentioned.) To avoid pre-vulcanization such heat treatment will of course be carried out before the vulcanizing agent is added to the compound. Particular care should be taken to avoid too much heating of the polyisocyanate treated lignin-rubber mix, as it is subject to scorching. Best results are achieved by hot mastication or static heating of the lignin-rubber masterbatch prior to the addition of the polyisocyanate, followed by further mastication on a cold mill after completing the addition of polyisocyanate.

Good results have been obtained by masticating the mixture, after addition of the polyisocyanate, for from 2 to 30 minutes at a temperature of 200°–350° F.

While it is not desired to limit the invention to any particular theory of operation, it is believed to be possible that the improvements obtained by the invention are a consequence of a chemical interaction of the polyisocyanate with the lignin molecule (which has active phenolic and hydroxyl groups) as well as with the rubber molecule.

Among the improved desirable properties obtained by the invention are:

(1) Improved abrasion resistance of 40% to 100% in the case of polyisocyanate treated GR–S/lignin and butadiene-methyl methacrylate/lignin coprecipitates as shown by laboratory and road tests, and to a lesser but substantial extent in the case of vinyl pyridine-butadiene/lignin mixes, so treated.

(2) Lowered torsional hysteresis as determined by decrements of observed amplitudes of successive oscillations of a torsional pendulum as explained in Gerke et al., U.S.P. 2,118,601.

(3) Higher modulus by A.S.T.M. methods.

(4) Reduced Shore A hardness for comparable moduli.

(5) Higher percent "bound rubber" and reduced swelling indices, indicating greater cross-linking. The expression "bound rubber" refers to a value that may be calculated from the gel content; thus:

Bound rubber $$= \frac{\text{percent gel.} - \text{percent known insoluble matter}}{\text{percent rubber}} \times 100$$

It is believed that increased bound rubber values are indicative of an increased degree of reinforcement.

The following examples will serve to illustrate the practice of the invention in more detail. The lignin employed in these examples was a commercial material known as "Indulin A." It is a purified pine wood alkali lignin derived from paper pulp sulfate black liquor. It is a brown, free-flowing amorphous powder typically having a specific gravity of 1.3, a moisture content of 4.3%, an ash content of 0.4%, an aqueous slurry pH of 3.4, a methoxyl content of 13.9%, an apparent density of 25 pounds per cubic foot, a fusion point of 250–275° C., and a sulfur content of 0.8–1.5%. It is insoluble in water and aqueous acids and in non-polar solvents. It is soluble in many polar solvents and in alkaline solutions.

EXAMPLE 1

3.0 kg. of Indulin A were dissolved in 12.7 liters of water containing 3.0 kg. of sodium hydroxide. This solution was blended into 13.1 kg. of a GR–S (butadiene: styrene) type 1500 latex, having a total solids content of 23%, and in which the rubber had a Mooney viscosity of 120 ML 4. The liquids were thoroughly mixed, forming a sodium lignate-latex blend, called "lignex."

The lignex was then flocculated by adding it, with rapid stirring, to 44 liters of water having a temperature of 95° C. and containing 1.0 liter of 90% formic acid. One minute later, 1.5 kg. of a commercial hydrocarbon oil used in rubber processing, known as Sundex 53, which had previously been heated to a temperature of 100° C., were slowly added to the rapidly stirred liquid, and high speed stirring was continued for another five minutes.

The liquid was then stirred slowly while an additional 13.1 kg. of the GR–S latex were added. Slow stirring was continued for 5 minutes after this addition.

The coprecipitate was allowed to stand for 10 minutes; then the slurry was filtered through coarse cotton filter cloth, first by gravity, and finished by suction. The filter cake was thoroughly washed by stirring it on the filter while running water over it. The cake or masterbatch was dried for 3 days in vacuo at a temperature of 80° C.

175 g. of the masterbatch were placed on a hot mill and masticated for 5 minutes at 300° F. The purpose of this hot milling was to remove moisture because the polyisocyanate might otherwise react preferentially with the moisture rather than with the lignin masterbatch. The masterbatch was then mixed on the mill at room temperature with the quantity of diphenylmethane diisocyanate shown in Table I, below. The diphenylmethane diisocyanate was a commercial preparation known as "MDI," containing about 90% of the diisocyanate. After sufficient milling to insure dispersion of the polyisocyanate, the stock was thereafter subjected to a post milling for an additional 10 minutes, either at room temperature or at 300° F., as indicated in Table I. The compounding of the stocks was completed by adding the following ingredients in the amount shown:

RECIPE I

| Ingredient: | Parts per hundred of rubber |
|---|---|
| Zinc oxide (Kadox) | 6.25 |
| Stearic acid | 2.50 |
| Benzothiazyl disulfide (MBTS) | 1.88 |
| Copper dimethyl dithiocarbamate (Cumate) | 0.85 |
| Sulfur | 3.1 |

The physical properties (after vulcanization) of several stocks prepared by this procedure are listed in Table I. In evaluating the results of the various treatments an attempt was made to compare data of cures which have approximately the elongation, hardness, and modulus preferred in a tread stock for pneumatic tires. For comparison there was also included a control stock, which was prepared and processed in essentially the same manner as the other stocks, except that the polyisocyanate treatment was omitted. The control stock was milled for twelve minutes at 300° F. before compounding, and contained 0.4 part of the Cumate accelerator, but did not differ otherwise from the polyisocyanate-treated preparations.

EXAMPLE 2

A study of various polyisocyanates was made in this example. Five different commercial polyisocyanates were compared in the treatment of the same oil extended GR-S/lignin masterbatch as used in Example 1. These polyisocyanates were:

90% diphenylmethane diisocyanate
Diphenylmethane diisocyanate
Toluene diisocyanate
Triphenylmethane triisocyanate, 20% in methylene dichloride
Hexamethylene diisocyanate The masterbatch was first worked 5 minutes at 300° F. on a hot mill for the purpose of drying, as before, followed by cooling and incorporation of the polyisocyanate on the cool mill.

Each mixture was then transferred to a hot mill and masticated for 5 minutes more at 300° F. Each mixture was thereafter compounded on a cool mill according to Recipe I, supra, except that the accelerators and sulfur were reduced as the isocyanate was increased, to attain proper cures in accordance with conventional compounding practice.

Physical data for stocks having comparable moduli are set out in Table II:

Table 1

| Stock | Parts of MDI[1] per 100 parts of rubber | Temperature during post milling after adding MDI,[1] °F. | Relative abrasion rating | Modulus at 300% elongation (p.s.i.) | Torsional hysteresis at 280° F. | Tensile strength, p.s.i. | Elongation at break (percent) | Durometer hardness (A scale) |
|---|---|---|---|---|---|---|---|---|
| A | 2 | (2) | 177 | 1,360 | 0.088 | 2,680 | 470 | 58 |
| B | 6 | (2) | 201 | 1,750 | 0.079 | 2,850 | 390 | 60 |
| C | 2 | 300 | 162 | 1,220 | 0.077 | 2,970 | 500 | 57 |
| D | 6 | 300 | 180 | 1,560 | 0.069 | 2,740 | 390 | 58 |
| E | [3] None | 300 | 100 | 1,000 | 0.126 | 2,470 | 490 | 58 |

[1] 90% diphenylmethane diisocyanate.
[2] Room temperature.
[3] Control.

From the data in Table I, it will be seen that the polyisocyanate treatment improved the laboratory abrasion resistance by roughly 60 to 75% when 2 parts per hundred of rubber of the MDI (90% diphenylmethane diisocyanate) were used, and about 80 to 100% when 6 parts were used. Also, the polyisocyanate treatment significantly increased the modulus and decreased the torsional hysteresis.

The polyisocyanate treatment also roughly doubled the bound rubber (indicating an increased degree of reinforcement). Thus, stocks A and C in Table I above gave the following gel and bound rubber values, in comparison to a control in which the stock received no diisocyanate treatment but was simply massed on a mill at room temperature:

| Stock | Percent gel | Percent bound rubber |
|---|---|---|
| A | 63 | 60 |
| C | 58 | 51 |
| Control | 46 | 30 |

Table II (i) COMPOUNDING AND TREATMENT

[Parts (per 100 parts of rubber)]

| Stock | Polyisocyanate | | Benzothiazyl disulfide | Copper dimethyl dithiocarbamate | Sulfur |
|---|---|---|---|---|---|
| A | Control | None | 1.88 | 0.4 | 3.1 |
| B | Diphenylmethane diisocyanate. | 2 | 0.6 | 0.3 | 3.1 |
| C | Toluene diisocyanate | 2 | 0.6 | 0.3 | 2.5 |
| D | Triphenylmethane triisocyanate.[1] | 2 | 0.6 | 0.3 | 2.5 |
| E | Hexamethylene diisocyanate. | 2 | 0.6 | 0.3 | 2.5 |
| F | 90% diphenylmethane diisocyanate. | 2 | 0.6 | 0.3 | 2.5 |

[1] As 20% solution in methylene dichloride.

(2) PHYSICAL PROPERTIES

| Stock | Relative abrasion rating | Modulus at 300% elongation (p.s.i.) | Torsional hysteresis at 280° F. | Tensile strength, p.s.i. | Elongation at break (percent) | Durometer hardness (A scale) |
|---|---|---|---|---|---|---|
| A | 100 | 1,000 | .126 | 2,470 | 490 | 58 |
| B | 146 | 1,050 | .081 | 2,600 | 470 | 53 |
| C | 158 | 1,020 | .088 | 2,710 | 500 | 53 |
| D | 174 | 1,160 | .076 | 2,980 | 510 | 51 |
| E | 165 | 1,070 | .094 | 2,780 | 510 | 54 |
| F | 157 | 990 | .089 | 2,970 | 500 | 53 |

The various polyisocyanates appear to be roughly about equal in efficacy of treatment, the range of abrasion improvement being about 46 to 74%, averaging roughly 60% improvement. In all cases there are additional benefits in reduced hysteresis, and reduction of hardness of vulcanizates. The above data indicate increase in modulus with decreased accelerator requirement, associated with the polyisocyanate treatment.

EXAMPLE 3

This example shows the effects of adding polyisocyanates without any hot milling. In this example two masterbatches were prepared.

One masterbatch (masterbatch 3-A) was a single-step coprecipitate of 100 parts #1500 GR-S and 40 parts lignin. The second masterbatch (masterbatch 3-B), was prepared in essentially the same manner except that 50 parts of lignin were coprecipitated. The result of physical tests of stocks made from masterbatches 3-A and 3-B are set out in Tables III, A and III, B respectively.

Amounts of selected polyisocyanates (based upon dry weight of the rubber) were added to separate portions of 140 parts each of masterbatch 3-A as shown in Table III, A and to separate portions of 150 parts each of masterbatch 3-B as shown in Table III, B.

The control and diisocyanate treated batches of Table III, A were cool milled for 10 minutes, then compounding was completed on a cool mill.

In Table III, B a control containing 50 parts lignin was run which was milled 12 minutes at 300° F., whereas the treated batches were milled 12 minutes on a mill at room temperature before further compounding. The purpose of this variation was for comparison of masterbatches which had been treated according to the invention and cool milled, with an untreated masterbatch which had the benefit of hot milling.

Ingredient: Parts (per hundred of rubber)
Zinc oxide (Kadox) _____ 5.
Hydrocarbon oil plasticizer (Paraflux) _____ 5.
Stearic acid _____ 2.
Benzothiazyl disulfide (MBTS) _____ 1.5.
Copper dimethyl dithiocarbamate (Cumate) _____ 0.15 to 0.35 to achieve desired cure.
Sulfur _____ 2.5.

Physical data of masterbatch 3-A (40 parts of lignin) are given in the following Table III, A.

Table III, A

| Parts of 90% diphenylmethane diisocyanate (per hundred of rubber) | Relative rating abrasion | Modulus at 300% elongation, p.s.i. | Torsional hysteresis at 280° F. | Tensile strength (p.s.i.) | Elongation at break (percent) | Durometer hardness (A scale) |
|---|---|---|---|---|---|---|
| Control none | 100 | 740 | .264 | 2,960 | 570 | 69 |
| 1 | 142 | 800 | .210 | 3,110 | 590 | 64 |
| 2 | 165 | 990 | .190 | 3,250 | 510 | 64 |
| 8 | 170 | 1,160 | .204 | 2,860 | 410 | 65 |

Relative increase in abrasion resistance by use of the polyisocyanate is about the same when all milling is cool as when it is hot; however the level of the ratings is considerably lower for the former. Over the range of 1-8 parts of polyisocyanate per hundred of rubber, the major increase occurred with the first 2 parts.

As for the other physical properties, torsional hysteresis and hardness decreased but not to the extent achieved when hot milling was employed. Also, after 1 part there was very little change by having added up to 8 parts of the polyisocyanate. The modulus (S-300) increased with the amount of polyisocyanate.

The effect of addition of 2 parts of various diisocyanates and monoisocyanates to the masterbatch 3-B without prior hot mixing was studied, with the results given in Table III, B below:

Table III, B

| Chemical | Relative abrasion rating | Modulus at 300% elongation (p.s.i.) | Torsional hysteresis at 280° F. | Tensile strength (p.s.i.) | Elongation at break (percent) | Durometer hardness (A scale) |
|---|---|---|---|---|---|---|
| Control, no isocyanate (hot mixed) | 100 | 1,040 | .244 | 3,580 | 600 | 69 |
| 90% diphenylmethane diisocyanate | 113 | 1,090 | .263 | 3,570 | 560 | 71 |
| Toluene diisocyanate | 120 | 1,140 | .255 | 3,790 | 590 | 72 |
| Naphthalene diisocyanate | 120 | 1,110 | .257 | 3,640 | 450 | 71 |
| Alpha-naphthyl isocyanate | 77 | 810 | .325 | 3,360 | 620 | 81 |
| Phenyl isocyanate | 78 | 860 | .335 | 3,150 | 570 | 79 |

Although the treated masterbatch was not heat treated prior to incorporating the isocyanate, the improvement in abrasion rating is evident, even when compared with a hot processed control.

Also, it is immediately evident that monoisocyanates produced no benefit in physical properties. The monoisocyanate-treated stocks more nearly represent a true level for comparison with diisocyanate treated stocks which were not hot processed than does the hot processed "control." A plausible explanation of the failure of the monoisocyanates is that the molecules of the mono type form bonds only with either the rubber hydrocarbon or the lignin but not with both, as are thought to take place when the polyisocyanates are added.

Thus, it may be concluded that increase in abrasion resistance and modulus, and reduction in hysteresis and hardness, accompany polyisocyanate treatment of cold mixed stocks, though these improvements are less when compared with similar treatment of a lignin masterbatch with prior hot mixing. (See Table III, B above.)

EXAMPLE 4

In this example, a 100 part #1500 GR-S/50 parts lignin masterbatch, following the same recipe as was used previously but which was hot milled 5 min. at 300° F., was prepared for the purpose of studying the effect of variations in accelerators on polyisocyanate treated GR-S/lignin mixtures. After addition of the polyisocyanate, the mixture was milled for an additional 10 minutes at room temperature. That portion of the masterbatch used as a control was hot milled for 12 minutes so that hot milled control stock could be compared to the polyisocyanate-treated stocks. The results are set out in Tables IV, A and IV, B (the amounts of the ingredients being expressed as parts per hundred parts of rubber).

Table IV, A

| Treatment | Parts of accelerator (cumate) | Relative abrasion rating | Modulus at 300% elongation, p.s.i. | Tensile strength (p.s.i.) | Elongation at break (percent) | Durometer hardness (A scale) |
|---|---|---|---|---|---|---|
| None (control) | 0.4 | 100 | 1,270 | 3,120 | 510 | 69 |
| 90% diphenylmethane diisocyanate, 1 part | 0.3 | 134 | 1,900 | 3,130 | 370 | 64 |
| 90% diphenylmethane diisocyanate, 2 parts | 0.27 | 147 | 1,930 | 2,900 | 370 | 65 |
| Toluene diisocyanate, 2 parts | 0.27 | 127 | 1,770 | 3,380 | 450 | 71 |

These data confirm previous experience with diisocyanate treatment of lignin masterbatches which show:
(1) 30 to 50% improvement in abrasion rating,
(2) Higher modulus and reduced accelerator requirement.

Table IV, B

| Parts | | | | Relative abrasion rating | Modulus at 300% elongation (p.s.i.) | Torsional hysteresis at 280° F. | Tensile strength (p.s.i.) | Elongation at break (percent) | Durometer hardness (A scale) |
|---|---|---|---|---|---|---|---|---|---|
| MDI[1] | MBTS | Cumate | Sulfur | | | | | | |
| None | 1.5 | 0.4 | 2.5 | 100 | 1,290 | .219 | 3,240 | 510 | 67 |
| 1 | 1.5 | 0.2 | 2.5 | 150 | 1,420 | .122 | 3,490 | 520 | 60 |
| 1 | 1.5 | 0.1 | 2.5 | 138 | 1,220 | .131 | 3,240 | 530 | 59 |
| 1 | 0.75 | 0.3 | 2.5 | 158 | 1,350 | .127 | 3,540 | 510 | 61 |
| 1 | 1.0 | 0.3 | 2.0 | 154 | 1,600 | .126 | 3,060 | 430 | 62 |

[1] 90% diphenylmethane diisocyanate.

For a stock treated with 1 part of MDI (90% diphenylmethane diisocyanate) the best physical properties are obtained with about ½ the benzothiazyl disulfide (MBTS) and about ¾ the copper dimethyl dithiocarbamate (cumate) normally used in an untreated stock. This confirms previous experiments in which the use of 2 parts of diisocyanate required about ⅓ the benzothiazyl disulfide and ¾ the copper dimethyl dithiocarbamate normally used in the untreated control stock.

The polyisocyanate treatments resulted in the desired increase in abrasion rating (30–50%) and reduction in hysteresis and hardness.

To study the storage stability of the treated masterbatches, the gel and bound rubber of treated raw stocks were determined after bin storage for 1 month. Both unmilled and freshly-milled samples were tested for indications of "setting up" or formation of loosely gelled structure. The results are tabulated in Table IV, C.

Table IV, C
EFFECTS OF MDI ON GEL AND BOUND RUBBER

| Polyisocyanate treatment | Treatment | Percent gel | Swelling index | Percent bound rubber |
|---|---|---|---|---|
| None (control) | No milling | 50 | 25 | 27 |
| Do | Light milling | 48 | 26 | 24 |
| 1 part MDI[1] | No milling | 74 | 11 | 61 |
| Do | Light milling | 68 | 11 | 58.5 |

[1] Parts of 90% diphenylmethane diisocyanate, per hundred parts of rubber.

Bound rubber was about doubled by the polyisocyanate treatment and light milling does not affect this ratio. Swelling index measurements show a much tighter gel structure brought about by the polyisocyanate treatment.

EXAMPLE 5

In this example, a large scale masterbatch of pilot plant size was prepared from which tire treads were made for laboratory and road tests.

The masterbatch consisted essentially of GR–S/type 1500 latex (22.3% T.S., having a Mooney viscosity of about 50–60) and Indulin A; its composition was 100 parts GR–S to 50 parts lignin dry solids by weight. This masterbatch was premasticated for 5 minutes at 300° F. before addition of the diisocyanate; the untreated control was hot milled for 10 minutes at 300° F.

Commercially pure diphenylmethane diisocyanate was used for the treatment. After the incorporation of the diisocyanate (about 5 minutes), the masterbatch was post milled 2 min. at a stock temperature of 300° F.

Physical test data for comparable cures, are:

Table V, A

| Treatment of tire stock | Relative abrasion rating | Modulus at 300% elongation (p.s.i.) | Torsional hysteresis at 280° F. | Tensile strength (p.s.i.) | Elongation at break (percent) | Durometer hardness (A scale) |
|---|---|---|---|---|---|---|
| Untreated control | 100 | 1,420 | .207 | 2,800 | 450 | 62 |
| 2 parts of commercially pure diphenylmethane diisocyanate (per 100 parts of rubber) | 132 | 1,530 | .091 | 3,370 | 440 | 52 |

The improvement in abrasion resistance by the polyisocyanate treatment is about 30%; hysteresis and hardness are reduced about as usual.

The control stock and diisocyanate treated stock were used to recap 6.70 x 15 tires. Sets of tires composed of control stock and diisocyanate treated stock were placed on a taxicab and on a newspaper delivery truck in Los Angeles. Laboratory physical test data of tire stocks cured for 45 min. at 45# cures and results of tread wear in use on the taxicab and delivery truck are compared in Table V, B:

Table V, B

| Stock | Relative abrasion rating | Modulus at 300% elongation (p.s.i.) | Tensile strength (p.s.i.) | Elongation at break (percent) | Tread wear rating Los Angeles | |
|---|---|---|---|---|---|---|
| | | | | | Taxicab, 4,684 mi. | Newspaper delivery, 4,134 mi. |
| Control | 100 | 1,230 | 2,910 | 500 | 100 | 100 |
| Polyisocyanate treatment | 132 | 1,200 | 2,600 | 440 | 130 | 122 |

The polyisocyanate treated stock shows about 30% improvement by the laboratory abrasion test, whereas in the wear test the treatment resulted in 30% and 22% improvement for taxicab and newspaper delivery service, respectively.

EXAMPLE 6

To show that a polyisocyanate additive to rubber/lignin mixtures is not limited to butadiene-styrene copolymers, the following masterbatch of lignin/butadiene-vinylpyridine rubber was prepared as follows:

12 kg. (26.5 lb.) of Indulin A were suspended in 48 l. (12.7 gal.) of water at 40° to 50° C. With continuous stirring, a solution of 1.2 kg. (2.65 lb.) of sodium hydroxide dissolved in 2.5 l. (0.66 gal.) of water was added. Stirring was continued an additional 10 minutes or until all the lignin was dissolved to form sodium lignate.

The sodium lignate solution was added slowly to 135 kg. (298 lb.) of a latex containing 30 kg. (66.1 lb.) of a 2-methyl-5-vinylpyridine:butadiene (25:75) copolymer using a mechanical stirrer to form a lignex.

A flocculating solution consisting of 4.2 l. (1.11 gal.) of 90% formic acid diluted by addition of 460 l. (122 gal.) of water at 90° C. was prepared. To this flocculating solution under a high speed stirrer the lignex was slowly added and stirring continued 5 minutes after final addition of the lignex. The lignin and vinylpyridine copolymer rubber coflocculated.

The flocculated lignin-rubber composition was filtered using suction.

The lignin-rubber filtrate was then reslurried by adding water to produce a total of 250 to 300 gallons. The temperature is preferably about 70° C. Suction was continued to dry the filtrate as much as possible.

The filtrate was thereafter transferred to a circulating air oven and dried at 150° F. This batch yielded about 90 to 93 lbs. of coflocculated lignin-vinylpyridine rubber containing 40 parts lignin per 100 parts dry rubber solids.

Two portions of the masterbatch were each placed on a hot mill. One portion was transferred to a cool mill at the end of 5 minutes and had added thereto on the cool mill 2 parts of 90% diphenylmethane diisocyanate (per 100 parts of rubber); it was then replaced on the hot mill and milled an additional 5 minutes at 300° F. The other portion, the control, continued milling 12 minutes on the hot mill before cooling. Both portions were then compounded on a cool mill as follows:

Ingredient: Parts (per hundred of rubber)
- Zinc oxide (Kadox) _____ 5.
- Plasticizer (Paraflux) _____ 5.
- Stearic acid _____ 2.
- Sulfur _____ 2.
- Benzothiazyl disulfide (MBTS) __ 0.1 part added to control only.

Table VI presents data for vulcanizates made from the treated and control stocks having comparable cures:

Table VI

| Treatment | Modulus at 300% elongation (p.s.i.) | Tensile strength (p.s.i.) | Elongation at break (percent) | Durometer hardness (A scale) | Relative abrasion rating | Torsional hysteresis at 280° F. |
|---|---|---|---|---|---|---|
| None (control) | 1,300 | 2,810 | 500 | 67 | 100 | .222 |
| Diphenylmethane diisocyanate | 1,440 | 2,720 | 470 | 68 | 114 | .234 |

The data show that the abrasion resistance was improved.

EXAMPLE 7

A masterbatch was prepared consisting essentially of (25:75) methyl methacrylate-butadiene 122° F. copolymer 100 parts and Indulin A lignin 50 parts, following the recipe set forth under Example 3, supra, except the methyl methacrylate-butadiene copolymer was substituted for the butadiene-styrene used in that example.

To one portion of the masterbatch were added 2 parts of 90% diphenylmethane diisocyanate. A second portion was untreated for control purposes. The procedure and recipe followed were essentially those set out in Example 6 except added accelerators (benzothiazyl disulfide and copper dimethyl dithiocarbamate) were added to effect a satisfactory cure. Hot milling at 300° F. for a minimum of 5 minutes after treatment appeared to enhance the physical properties of the stocks.

Selected data based upon equivalent cures are set out in Table VII.

Table VII

| Treatment | Modulus at 300% elongation (p.s.i.) | Tensile strength (p.s.i.) | Elongation at break (percent) | Durometer hardness (A scale) | Relative abrasion rating | Torsional hysteresis at 280° F. |
|---|---|---|---|---|---|---|
| None—Hot processed control | 1,090 | 2,700 | 530 | 68 | 100 | .286 |
| Diisocyanate treated | 1,250 | 2,560 | 540 | 62 | 146 | .214 |

Treatment of this masterbatch with polyisocyanate produced improvements in physical properties similar to those observed in cold GR–S/lignin mastebatches, viz. abrasion resistance and modulus were increased and torsional hysteresis and stock hardness were reduced significantly.

EXAMPLE 8

Since commercially prepared GR–S #1500/lignin is readily available in the ratio of 100 parts GR–S to 70 parts lignin under the trade name of Indulin–70–GRS, the following experiment was performed, in which such a high lignin content masterbatch was cut back by merely adding dry polymer (GR–S, type 1500), on a mill and subsequently treating it with 2 parts (per hundred of rubber) of 90% diphenylmethane diisocyanate procured from Du Pont, as a further embodiment of this invention.

The masterbatch was milled at 300° F. After 10 minutes a portion was transferred to a cool mill, had added thereto 2 parts of the diisocyanate, and was then transferred back to the hot mill where it was milled 5 minutes more. The remaining portion of the masterbatch (the control) was allowed to remain at 300° F. on the hot mill 12 min. before cooling; the control was not remilled as was the treated stock.

Both portions were compounded as in Example 7 above with minor variations in the accelerators to obtain proper cures.

Data gathered from tests of stocks made therefrom are presented in Table VIII. Comparison of treated stock to untreated control stock is made in Table VIII.

Selected data of cures having comparable modulus values are set forth below:

Table VIII

| Treatment | Modulus at 300% elongation (p.s.i.) | Tensile strength (p.s.i.) | Elongation at break (percent) | Durometer hardness (A scale) | Relative abrasion rating | Torsional hysteresis at 280° F. |
|---|---|---|---|---|---|---|
| None (control) | 1,230 | 2,800 | 510 | 62 | 100 | .186 |
| Polyisocyanate treated | 1,290 | 2,930 | 460 | 55 | 111 | .088 |

It may be seen that though the lowered hysteresis and reduced hardness compare favorably with a regularly prepared coprecipitate of 40 or 50 parts lignin as set out in Examples 1 through 4, supra, the abrasion resistance improvement is less pronounced though appreciable.

EXAMPLE 9

A lignex comprised of 100 parts of Hevea rubber latex and 50 parts (per hundred of rubber) of lignin was flocculated with dilute formic acid to yield a masterbatch.

To demonstrate the invention, a first portion of the masterbatch, designated A, was milled for 5 minutes at 300° F., after which 2 parts (per hundred of rubber) of redistilled toluene diisocyanate were incorporated in the masterbatch by mixing for 5 minutes on a cool mill. The stock was then milled for an additional 5 minutes at 300° F.

As a control, a second portion of the masterbatch, designated B, was milled for 12 minutes at 300° F.

The diisocyanate-treated portion A and the control portion B were then compounded with vulcanizing ingredients on a cool mill, in essentially the same manner as in previous examples. After curing samples of these stocks in a press at 45 p.s.i. steam pressure for varying times, the physical properties were as shown in Table IX.

Table IX

| | Diisocyanate treated stock A | | | Untreated control stock B | | |
|---|---|---|---|---|---|---|
| Time of cure | 22' | 45' | 90' | 22' | 45' | 90' |
| Test: | | | | | | |
| Modulus at 300% elongation (p.s.i.) | 1,900 | 1,960 | 1,700 | 1,870 | 1,660 | 1,400 |
| Tensile strength (p.s.i.) | 3,100 | 2,770 | 2,350 | 3,110 | 3,040 | 2,840 |
| Elongation at break (percent) | 430 | 420 | 360 | 440 | 460 | 570 |
| Durometer hardness (A scale) | 55 | 55 | 56 | 63 | 64 | 64 |
| Torsional hysteresis at 280° F. | .091 | .076 | | .169 | .174 | |
| Relative abrasion rating | 116.1 | 104.1 | | 84.2 | 70.2 | |

These data show the improvement in abrasion resistance, lowered hysteresis, and decreased hardness resulting from the polyisocyanate treatment of the invention.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method which comprises incorporating an organic polyisocyanate in a dry lignin-rubber co-coagulum of a mixture of a rubber latex and an alkaline aqueous solution of lignin, the lignin being in quantity not more than 100 parts per 100 parts of rubber in the lignin-rubber co-coagulum, and the polyisocyanate being in quantity not more than 10 parts per 100 parts of said rubber, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

2. The method which comprises incorporating an organic polyisocyanate in a dry lignin-rubber co-coagulum of a mixture of a rubber latex and an alkaline aqueous solution of lignin, the lignin being in amount from 25 to 100 parts per 100 parts of rubber in the lignin-rubber co-coagulum, and the polyisocyanate being in amount from 0.5 to 10 parts per 100 parts of said rubber, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

3. The method which comprises heating at a temperature from 200° F. to 350° F. for 5 minutes to 10 hours a dry lignin-rubber co-coagulum of a mixture of a rubber latex and an alkaline aqueous solution of lignin, the ratio of lignin to rubber in the co-coagulum being 25 to 100 parts of lignin per 100 parts of rubber, and thereafter mixing into the thus treated lignin-rubber co-coagulum 0.5 to 10 parts of an organic polyisocyanate per 100 parts of said rubber, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

4. The method which comprises heating for 2 to 30 minutes at a temperature from 200° F. to 350° F. a mixture of an organic polyisocyanate and a dry lignin-rubber co-coagulum of a mixture of a rubber latex and an alkaline aqueous solution of lignin, the lignin being in amount from 25 to 100 parts per 100 parts of rubber in the lignin-rubber co-coagulum, and the polyisocyanate being in amount from 0.5 to 10 parts per 100 parts of said rubber, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

5. The method which comprises heating at a temperature from 200° F. to 350° F. for 5 minutes to 10 hours a dry lignin-rubber co-coagulum of a mixture of a rubber latex and an alkaline aqueous solution of lignin, the ratio of lignin to rubber in the co-coagulum being 25 to 100 parts of lignin per 100 parts of rubber, thereafter mixing into the thus treated lignin-rubber co-coagulum 0.5 to 10 parts of an organic polyisocyanate per 100 parts of said rubber, and thereafter heating the mixture of polyisocyanate and lignin-rubber co-coagulum for 2 to 30 minutes at a temperature from 200° F. to 350° F., said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

6. The method of claim 2 in which the polyisocyanate is diphenylmethane diisocyanate.

7. The method of claim 2 in which th polyisocyanate is toluene diisocyanate.

8. The method of claim 2 in which the polyisocyanate is triphenylmethane triisocyanate.

9. The method of claim 2 in which the polyisocyanate is hexamethylene diisocyanate.

10. The method of claim 2 in which the polyisocyanate is naphthalene diisocyanate.

11. A rubber stock comprising 100 parts of a rubber, from 25 to 100 parts of lignin, and from 0.5 to 10 parts of an organic polyisocyanate, said rubber and lignin having been co-coagulated from a mixture of rubber latex and an alkaline aqueous solution of lignin, and said polyisocyanate having been mixed into the dry lignin-rubber co-coagulum, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

12. A rubber stock as in claim 11 in which the polyisocyanate is diphenylmethane diisocyanate.

13. A rubber stock as in claim 11 in which the polyisocyanate is toluene diisocyanate.

14. A rubber stock as in claim 11 in which the polyisocyanate is triphenylmethane triisocyanate.

15. A rubber stock as in claim 11 in which the polyisocyanate is hexamethylene diisocyanate.

16. A rubber stock as in claim 11 in which the polyisocyanate is naphthalene diisocyanate.

17. A product comprising a vulcanized rubber composition comprising 100 parts of a rubber, from 25 to 100 parts of lignin, and from 0.5 to 10 parts of an organic polyisocyanate, said rubber and lignin having been co-coagulated from a mixture of rubber latex and an alkaline aqueous solution of lignin, and said polyisocyanate having been mixed into the dry lignin-rubber co-coagulum, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

18. A rubber stock comprising a rubber and lignin and organic polyisocyanate, the lignin being in quantity not more than 100 parts per 100 parts of a rubber, and the polyisocyanate being in quantity not more than 10 parts per 100 parts per 100 parts of a rubber, said rubber and lignin having been co-coagulated from a mixture of a rubber latex and an alkaline aqueous solution of lignin, and said polyisocyanate having been mixed into the dry lignin-rubber co-coagulum, said rubber being selected from the group consisting of natural rubber and synthetic rubber polymers of material selected from the group consisting of butadienes-1,3 and mixtures of butadienes-1,3 with compounds which contain a $CH_2=C<$ group and are copolymerizable with butadienes-1,3.

References Cited in the file of this patent

UNITED STATES PATENTS

| | | |
|---|---|---|
| 2,436,222 | Neal et al. | Feb. 17, 1948 |
| 2,608,537 | Pollak | Aug. 26, 1952 |

OTHER REFERENCES

"Synthetic Rubber," Whitby, edition published by John Wiley & Sons, Inc., New York (1954), pages 926–932 relied on.